Patented Dec. 5, 1922.

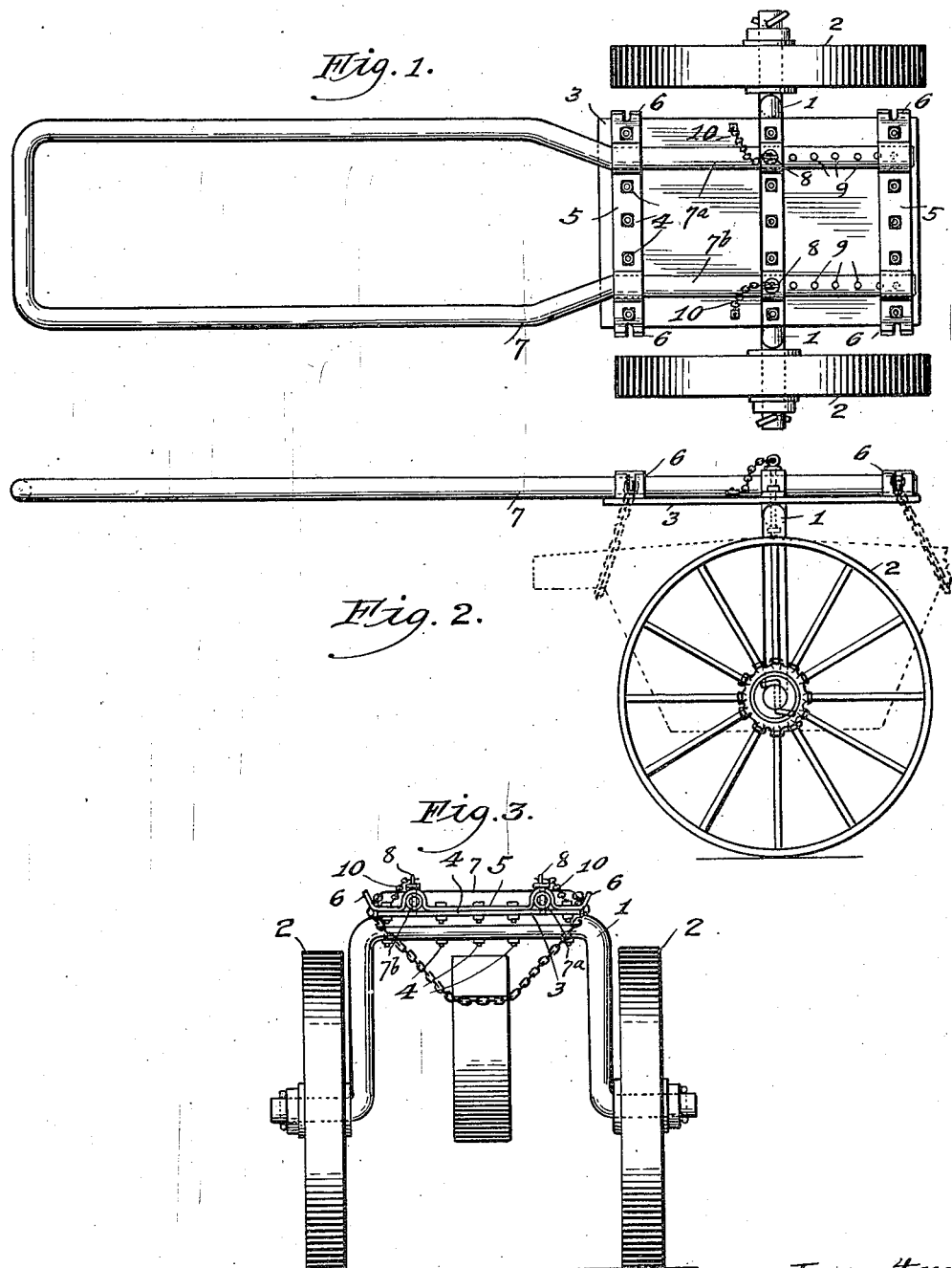

1,437,971

UNITED STATES PATENT OFFICE.

WILLIAM GAKLE, OF CHICAGO, ILLINOIS.

TRUCK.

Application filed June 13, 1921. Serial No. 477,331.

*To all whom it may concern:*

Be it known that I, WILLIAM GAKLE, a citizen of the United States, and a resident of the city of Chicago, county of Cook, and State of Illinois, have invented certain new and useful Improvements in Trucks, of which the following is a specification.

This invention relates to improvements in trucks and refers more particularly to trucks for use in foundries, shops and manufacturing concerns where heavy castings or steel parts are to be transported from place to place and where it is not convenient to swing the parts on to a travelling power crane.

Among the salient objects of the invention are to provide a hand truck in which the heavy objects to be transported are slung beneath the truck and suspended by detachable slings; to provide a truck which is sturdy of construction and one which may be used for transporting heavy castings, railroad parts, such as couplings, truck sides, etc.

Fig. 1 is a plan view of the truck.
Fig. 2 is a side elevational view.
Fig. 3 is a rear end view.

Referring to the drawing—the rigid axle 1 is carried by the wheels 2 which are mounted on the extremities thereof. This rigid axle is of heavy forged shafting or other rigid steel construction adapted to carry heavy weights without bending or breaking. Upon this axle is mounted a bed plate 3 fastened to the axle by means of bolts and nuts 4. To the bed plate are bolted, riveted or otherwise fastened the handle straps 5 having the upturned bifurcated end pieces 6 which extend slightly beyond the edge of the bed plate. A handle 7 is formed so that the two end legs 7ª and 7ᵇ may be inserted beneath the bowed portions of the handle straps 5 where the handle is held rigidly in place by means of the pins 8 inserted through the central strap and passing through the apertures 9 in the handle. These pins are fastened to the bed plate by means of chains or cords 10. The handle is adjustable and may be lengthened or shortened according to the size of the casting or object to be carried under the truck. The idea in the adjustable handle is to remove the truckman as far from the truck as possible so that more leverage may be procured on the handle and also the truckman will be removed from any portion of the elongated object which is being carried.

Supporting slings are fastened to the bifurcated ends of the straps as shown at 6 by passing the chain link between these bifurcated end pieces. In raising a heavy object the handle is elevated so that the rigid axle is lowered and one sling put in place about the object to be carried. The handle is then lowered, this motion raising the heavy object with the wheel as a fulcrum and the opposite end of the heavy object is then slightly raised and the second sling put in place. The object may then be transported wherever desired and even balance be maintained at all times so that there is no weight upon the handle of the truck, an improvement over the common type of warehouse truck where the truckman must bear a considerable part of the weight of the object carried on the truck.

Another object of this type of truck is the fact that the object carried is held in an underslung position beneath the axle and may be easily detached from the truck by simply removing the chain slings which may be easily slipped from the bifurcated supporting members on the bed plate. It is essential that the bed plate be sufficient to withstand the weight of most objects which can be trucked by hand as for example, made of rigid steel plate. The truck is admirably adapted for use in foundries and railroad shops where heavy castings must be moved from place to place by gangs of men where overhead power cranes are not available. The simplicity and the rugged character of the truck also adds to its novelty and adaptability to this type of work.

I claim as my invention:—

1. A truck for transporting heavy weights, comprising a bowed axle with wheels mounted at the extremities thereof, a support plate with handle straps mounted thereon, a handle adjustable in said straps, and means for supporting the objects to be carried in an underslung position beneath the axle.

2. A truck for transporting heavy weights, comprising an arched supporting axle carried by wheels, a bed mounted on the axle and an adjustable handle affixed to the assembly, detachable supporting members adapted to carry the transported objects in an underslung position beneath the axle.

3. A truck for transporting heavy objects, consisting in an arched supporting axle having wheels mounted on the extremities thereof, a bed plate mounted on the axle and a handle adjustably affixed to the assembly, supporting members mounted on the bed plate and adjustable slings for suspending the objects to be transported beneath the axle in an underslung position.

WILLIAM GAKLE.